United States Patent
Leglaye et al.

(10) Patent No.: US 11,739,712 B2
(45) Date of Patent: Aug. 29, 2023

(54) CONVERGENT-DIVERGENT FLAP PAIR FOR A VARIABLE-GEOMETRY TURBOJET ENGINE NOZZLE, THE FLAPS OF WHICH EACH COMPRISE A COOLING AIR CIRCULATION DUCT

(71) Applicant: SAFRAN AIRCRAFT ENGINES, Paris (FR)

(72) Inventors: François Leglaye, Moissy-Cramayel (FR); Florent Luc Lacombe, Moissy-Cramayel (FR); Pierre André Gabriel Malbois, Moissy-Cramayel (FR); Sylvain Marcel Oblaza, Moissy-Cramayel (FR); Thierry Kohn, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/753,181

(22) PCT Filed: Aug. 27, 2020

(86) PCT No.: PCT/FR2020/051504
§ 371 (c)(1),
(2) Date: Feb. 23, 2022

(87) PCT Pub. No.: WO2021/038171
PCT Pub. Date: Mar. 4, 2021

(65) Prior Publication Data
US 2022/0275771 A1 Sep. 1, 2022

(30) Foreign Application Priority Data

Aug. 30, 2019 (FR) ..................................... 1909545

(51) Int. Cl.
*F02K 1/12* (2006.01)
*F02K 1/82* (2006.01)

(52) U.S. Cl.
CPC ............ *F02K 1/1223* (2013.01); *F02K 1/822* (2013.01); *F05D 2220/323* (2013.01);
(Continued)

(58) Field of Classification Search
CPC ......... F05D 2250/323; F05D 2250/324; F05D 2260/201; F05D 2220/323; F02K 1/822; F02K 1/1223; F02K 1/06
See application file for complete search history.

(56) References Cited

U.S. PATENT DOCUMENTS 4,747,543 A    5/1988  Madden
5,775,589 A *  7/1998  Vdoviak .................. F02K 1/12
                                                    239/127.3

(Continued)

FOREIGN PATENT DOCUMENTS

EP           0541346 A1    5/1993

OTHER PUBLICATIONS

Search Report issued in French Patent Application No. 1909545 dated Jun. 23, 2020.
(Continued)

*Primary Examiner* — Todd E Manahan
*Assistant Examiner* — Rodolphe Andre Chabreyrie
(74) *Attorney, Agent, or Firm* — Pearne & Gordon LLP

(57) ABSTRACT

In a convergent-divergent flap pair for a turbojet engine nozzle of the variable-geometry convergent-divergent type, the convergent flap and the divergent flap including respective ducts for circulation of cooling air connected to one another to allow cooling of each of the flaps. The duct of the divergent flap includes an impingement cooling cavity defined by two walls of lateral ends provided with air
(Continued)

passage orifices through which the impingement cooling cavity opens towards the outside.

9 Claims, 5 Drawing Sheets

(52) U.S. Cl.
    CPC .. *F05D 2240/128* (2013.01); *F05D 2250/323* (2013.01); *F05D 2250/324* (2013.01); *F05D 2260/201* (2013.01)

(56) References Cited

U.S. PATENT DOCUMENTS

| | | | |
|---|---|---|---|
| 11,339,745 B1 * | 5/2022 | Metzger | F02K 1/1261 |
| 2005/0161527 A1 | 7/2005 | Murphy et al. | |
| 2009/0072044 A1 * | 3/2009 | Kehret | F02K 1/1223 |
| | | | 239/127.1 |
| 2009/0072490 A1 * | 3/2009 | Cowan | F02K 1/822 |
| | | | 277/562 |
| 2013/0001319 A1 * | 1/2013 | Cowan | F01D 11/005 |
| | | | 239/127.1 |

OTHER PUBLICATIONS

International Search Report for issued in Application No. PCT/FR2020/051504 dated Nov. 6, 2020.
Written Opinion for PCT/FR2020/051504 dated Nov. 6, 2020.

* cited by examiner

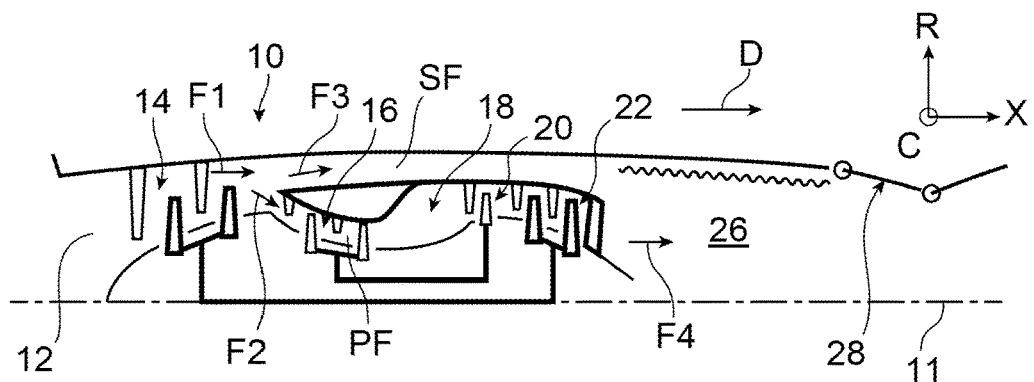

CONVERGENT-DIVERGENT FLAP PAIR FOR A VARIABLE-GEOMETRY TURBOJET ENGINE NOZZLE, THE FLAPS OF WHICH EACH COMPRISE A COOLING AIR CIRCULATION DUCT

This is the National Stage of PCT international application PCT/FR2020/051504, filed on Aug. 27, 2020 entitled "CONVERGENT-DIVERGENT FLAP PAIR FOR A VARIABLE-GEOMETRY TURBOJET ENGINE NOZZLE, THE FLAPS OF WHICH EACH COMPRISE A COOLING AIR CIRCULATION DUCT", which claims the priority of French Patent Application No. 1909545 filed Aug. 30, 2019, both of which are incorporated herein by reference in their entireties.

TECHNICAL FIELD

The present invention relates to the field of the turbojet engines intended for the propulsion of the aircraft capable of supersonic flight, and relates more particularly to a convergent-divergent flap pair for a turbojet engine nozzle of the variable-geometry convergent-divergent type, a nozzle equipped with such a convergent-divergent flap pair, and a turbojet engine comprising such a nozzle.

PRIOR ART

The turbojet engines intended for supersonic flight comprise in general a reheat channel, the outlet of which is defined by an axisymmetric nozzle of the convergent-divergent type, in order to allow the acceleration of the flow of air exiting the reactor to speeds greater than Mach 1.

To be efficient at the various speeds at which a supersonic aircraft is capable of flying, such a nozzle has a variable geometry, allowing to vary the inner cross-section of the nozzle and in particular the position and the shape of the throat of the nozzle.

For this purpose, such a nozzle includes a set of mobile inner flaps intended to channel the flow of gas exiting the reactor, this assembly comprising an annular row of convergent flaps followed by an annular row of divergent flaps. The divergent flaps are in general articulated at their respective upstream ends on respective downstream ends of the convergent flaps, and the convergent flaps themselves are articulated at their respective upstream ends on a stator structure of the turbojet engine. The set of mobile inner flaps thus consists of an annular row of convergent-divergent flap pairs.

Such a nozzle further includes an annular row of mobile outer flaps surrounding the set of mobile inner flaps.

Given the high temperature of the gases at the outlet of a reheat channel, it is desirable to ensure a cooling of the inner flaps of such a nozzle in order to guarantee their mechanical endurance.

For this purpose, cooling air must be taken from the working flow of air of the turbojet engine, this is why it is desirable to limit the quantity of air necessary for the cooling in order to optimise the propulsion performance of the reactor.

Such a goal contradicts, however, the desire to increase the richness of the reheat gases to improve the propulsion performance of the turbojet engines, because such an increase in richness involves an increase in temperature of the gases, and thus an increase in the need for cooling.

DISCLOSURE OF THE INVENTION

The goal of the invention is in particular to at least partially solve the above problem, and in particular to propose an effective solution for cooling of the mobile inner flaps of a variable-geometry convergent-divergent turbojet engine nozzle, while limiting the negative impact of such cooling on the propulsion performance of the turbojet engine.

For this purpose, the invention proposes a convergent-divergent flap pair for a turbojet engine nozzle of the variable-geometry convergent-divergent type, comprising a convergent flap, and a divergent flap mounted pivotably on the convergent flap about a pivot axis, whereby the convergent-divergent flap pair is capable of going from a first extreme angular configuration, in which the convergent flap and the divergent flap make between them a maximum salient angle, to a second extreme angular configuration, in which the convergent flap and the divergent flap make between them a minimum salient angle smaller than the maximum salient angle, wherein the convergent flap includes a respective inner wall, having a respective inner surface for channelling combustion gas and a respective outer surface, and a respective outer wall, wherein the convergent flap includes a respective duct for circulation of cooling air defined between the respective outer surface of the respective inner wall of the convergent flap, and the respective outer wall of the convergent flap, wherein the divergent flap includes a respective inner wall, having a respective inner surface for channelling combustion gas and a respective outer surface, and a respective outer wall, wherein the divergent flap includes a respective duct for circulation of cooling air defined between the respective outer surface of the respective inner wall of the divergent flap, and the respective outer wall of the divergent flap, and connected to the respective duct for circulation of cooling air of the convergent flap.

The divergent flap includes a multiperforated plate provided with impingement cooling orifices, and extending between the respective inner wall and the respective outer wall of the divergent flap, whereby the multiperforated plate divides the respective duct for circulation of cooling air of the divergent flap into:

a cavity for circulation of cooling air, defined between the respective outer wall of the divergent flap and the multiperforated plate, and connected to the respective duct for circulation of cooling air of the convergent flap, and an impingement cooling cavity defined between the multiperforated plate and the respective outer surface of the respective inner wall of the divergent flap, to allow a cooling of the respective inner wall of the divergent flap by impingement of jets of air formed through the impingement cooling orifices from air circulating in the cavity for circulation of cooling air.

The divergent flap includes two opposite lateral end walls each connecting the respective inner wall of the divergent flap to the outer wall of the divergent flap, so that each of the cavity for circulation of cooling air and the impingement cooling cavity is further defined by the respective lateral end walls of the divergent flap.

Each of the two respective lateral end walls of the divergent flap is provided with air passage orifices through which the impingement cooling cavity opens towards the outside.

The invention thus allows efficient cooling of mobile inner flaps, only requiring a moderate quantity of air, and thus having a moderate impact on the performance of a turbojet engine equipped with such a nozzle.

The invention thus allows to improve the mechanical endurance of mobile inner flaps and to control the thermal behaviour of the latter.

The invention further allows to limit the temperature of such a nozzle, and thus to limit the infrared signal thereof.

The limitation of the temperature of the nozzle further allows the use of a broader choice of materials in the latter, in particular materials for electromagnetic absorption that are in general not very tolerant with regard to high temperatures.

Preferably, the divergent flap includes a respective downstream end wall providing at least one opening by which the impingement cooling cavity opens downstream.

Preferably, the respective downstream end wall of the divergent flap connects the respective outer wall of the divergent flap to the multiperforated plate of the divergent flap.

Preferably, the divergent flap includes a closing wall, connecting the multiperforated plate of the divergent flap to the respective inner wall of the divergent flap, in such a way as to close an upstream end of the impingement cooling cavity of the divergent flap.

The invention also relates to a nozzle of the variable-geometry convergent-divergent type for a turbojet engine, comprising convergent-divergent flap pairs distributed around an axis of the nozzle and at least some of which are convergent-divergent flap pairs of the type described above, and a channel for circulation of combustion gas defined at least by the respective inner surfaces for channelling combustion gas of the respective inner walls of the respective convergent flaps and of the respective divergent flaps of the convergent-divergent flap pairs of the type described above.

Preferably, the convergent-divergent flap pairs of the type described above form follower convergent-divergent flap pairs, the nozzle further comprising controlled convergent-divergent flap pairs arranged in alternation circumferentially with the follower convergent-divergent flap pairs and comprising respective divergent flaps comprising respective walls for channelling combustion gas having respective inner surfaces for channelling combustion gas defining the channel for circulation of combustion gas.

Preferably, the air passage orifices of the respective lateral end walls of the respective divergent flaps of the follower convergent-divergent flap pairs open into the channel for circulation of combustion gas, opposite the respective walls for channelling combustion gas of the respective divergent flaps of the controlled convergent-divergent flap pairs.

Preferably, the respective divergent flaps of the controlled convergent-divergent flap pairs are flaps with a simple skin.

The invention also relates to a turbojet engine for an aircraft, comprising a reheat channel surrounded by a cooling plenum separated from the reheat channel by a thermal protection liner, and a nozzle of the type described above, wherein the respective cavities for circulation of cooling air of the convergent flaps of the convergent-divergent flap pairs of the type described above of the nozzle are connected to the cooling plenum surrounding the reheat channel.

BRIEF DESCRIPTION OF THE DRAWINGS

The invention will be better understood, and other details, advantages and features thereof will appear upon reading the following description made as a non-limiting example and in reference to the appended drawings in which:

FIG. 1 is a schematic half view of an axial cross-section of a turbojet engine comprising a nozzle of the variable-geometry convergent-divergent type, arranged at the outlet of a reheat channel;

FIG. 2 is a schematic half view of an axial cross-section of a reheat channel and of a nozzle of the variable-geometry convergent-divergent type of a known type;

FIG. 3 is a partial schematic perspective view of an annular row of divergent flaps that are part of the nozzle of FIG. 2;

Figure 4:
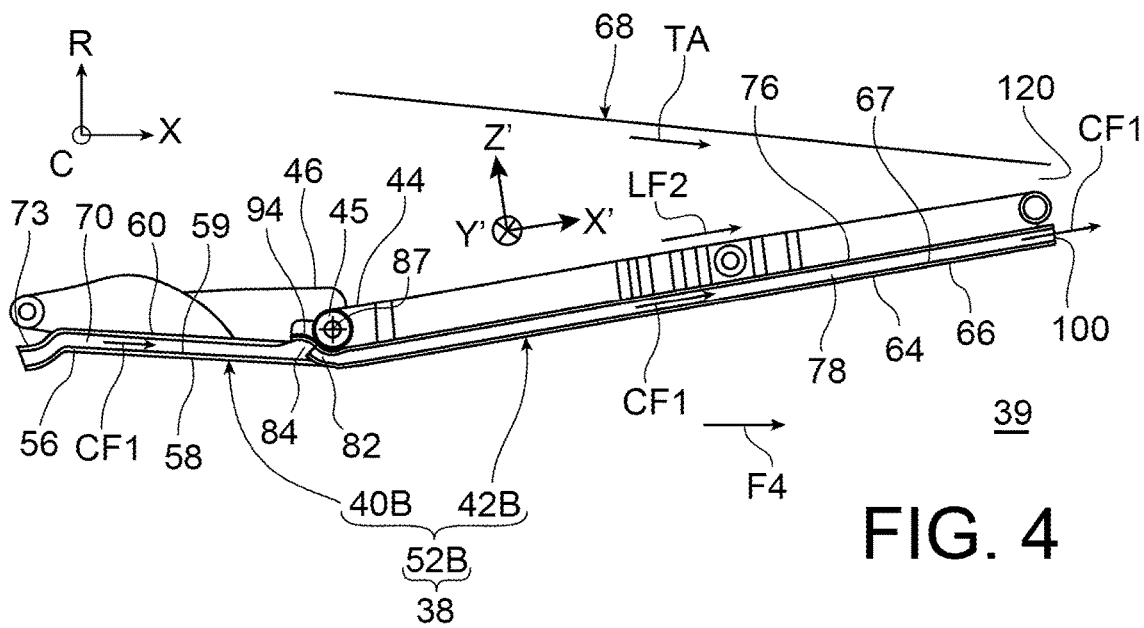
FIG. 4 is a partial schematic view of an axial cross-section of the nozzle of the variable-geometry convergent-divergent type of the turbojet engine of FIG. 1, comprising convergent-divergent flap pairs according to a preferred embodiment of the invention, one of which is visible in a first configuration.

In all of these drawings, identical references can designate identical or analogous elements. Moreover, these drawings respect neither the scale nor the proportions of the elements that are shown therein.

DETAILED DISCLOSURE OF PREFERRED EMBODIMENTS

FIG. 1 illustrates a turbojet engine 10, for example a two-spool turbofan, intended for the propulsion of an aircraft capable of supersonic flight, and thus intended in particular to be installed in the fuselage of such an aircraft.

Throughout this description, the axial direction X is the direction of the longitudinal axis 11 of the turbojet engine. Except when it is stipulated otherwise, the radial direction R is in all points a direction orthogonal to the longitudinal axis 11 and passing through the latter, and the circumferential direction C is in all points a direction orthogonal to the radial direction R and to the longitudinal axis 11. Except when it is stipulated otherwise, the terms "inner" and "outer" respectively refer to a relative proximity, and a relative distance, of an element with respect to the longitudinal axis 11. Finally, the adjectives "upstream" and "downstream" are defined in reference to a general direction D of the flow of the gases in the turbojet engine 10.

Such a turbojet engine 10 comprises, for illustrative purposes, from upstream to downstream, an air inlet 12, a low-pressure compressor 14, a high-pressure compressor 16, a combustion chamber 18, a high-pressure turbine 20, a low-pressure turbine 22, a reheat channel 26, and a nozzle 28 of the variable-geometry convergent-divergent type. These members of the turbojet engine are all centred according to the longitudinal axis 11 of the turbojet engine.

In a well-known manner, the high-pressure compressor 16, the combustion chamber 18, and the high-pressure 20 and low-pressure 22 turbines define a primary jet PF. The latter is surrounded by a bypass jet SF of the turbomachine that extends from upstream to downstream from an outlet of the low-pressure compressor. Thus, during operation, air F1 that entered through the air inlet 12 and that was compressed by the low-pressure compressor 14 is then divided into a primary flow F2 that circulates in the primary jet and a bypass flow F3 that circulates in the bypass jet 30. The primary flow F2 is thus compressed even more in the high-pressure compressor 16, then mixed with fuel and ignited in the combustion chamber 18, before undergoing an expansion in the high-pressure turbine 20 then in the low-pressure turbine 22.

The flow of gas F4, consisting of the mixture of the combustion gases, coming from the primary jet, and of the bypass flow F3, then circulates in the reheat channel 26, then escapes from the turbojet engine 10 through the nozzle 28.

In an operating mode with reheat, for example to propel an aircraft at supersonic speeds, fuel is mixed with the flow of gas F4 in the reheat channel 26, and the mixture thus formed is ignited inside this reheat channel, in order to generate additional thrust. The convergent-divergent configuration of the nozzle 28 thus allows to accelerate the flow of gas F4 to supersonic speeds.

FIG. 2 illustrates on a larger scale the reheat channel 26, and the nozzle 28, in a configuration known from the prior art.

The reheat channel 26 includes an outer envelope 32 having a shape of revolution, and a thermal protection liner 34 extending coaxially to the outer envelope 32 inside the latter. The outer envelope 32 and the thermal protection liner 34 define between them a cooling plenum 36 intended for the circulation of a flow of cooling air CF1 along the outer envelope 32.

The nozzle 28 includes a set 38 of mobile inner flaps defining on the outside a channel for circulation of combustion gas 39, which corresponds, in the turbojet engine, to a downstream end part of the reheat channel 26. The mobile inner flaps thus allow to channel the flow of gas F4 at the outlet of the turbojet engine 10 during operation.

The set 38 of mobile inner flaps comprises, upstream, an annular row of convergent flaps 40, followed, downstream, by an annular row of divergent flaps 42.

The divergent flaps 42 are articulated, at their respective upstream ends 44, respectively on respective downstream ends 46 of the convergent flaps 40. The convergent flaps 40 are themselves articulated at their respective upstream ends 48 on a stator structure 50 of the turbojet engine.

The set 38 of mobile inner flaps thus consists of an annular row of convergent-divergent flap pairs 52, the flaps of each pair being articulated to be capable of going from a first extreme angular configuration, in which the convergent flap and the divergent flap make between them a maximum salient angle, to a second extreme angular configuration, in which the convergent flap and the divergent flap make between them a minimum salient angle smaller than the maximum salient angle, and vice versa, in a manner known per se.

For example, the set 38 includes controlled convergent-divergent flap pairs 52A, and follower convergent-divergent flap pairs 52B, disposed in alternation in the circumferential direction C. The controlled convergent-divergent flap pairs 52A consist of controlled convergent flaps 40A and of controlled divergent flaps 42A, while the follower convergent-divergent flap pairs 52B consist of follower convergent flaps 40B and of follower divergent flaps 42B. FIG. 3 shows respective divergent flaps 42A, 42B of controlled pairs 52A and of follower pairs 52B.

The controlled pairs 52A, one of which is visible in FIG. 2, are directly connected to respective actuation members 54 of the nozzle, which actuation members are mounted on the stator structure 50 of the turbojet engine, in such a way as to directly control the movement of the controlled pairs 52A. The follower pairs 52B cooperate with the adjacent controlled pairs 52A via drive members (not visible in the drawings) configured to communicate a movement of the controlled pairs 52A to the follower pairs 52B.

The convergent flaps 40 each include a respective wall for channelling combustion gas 56, extending according to a respective longitudinal direction of the flap, and having, on a radially inner side, a respective inner surface for channelling combustion gas 58 and, on a radially outer side, a respective outer surface 59.

The divergent flaps 42 each include a respective wall for channelling combustion gas 64, extending according to a respective longitudinal direction of the flap, and having, on a radially inner side, a respective inner surface for channelling combustion gas 66 and, on a radially outer side, a respective outer surface 67.

The respective inner surfaces for channelling combustion gas 58 and 66 of the convergent flaps 40 and of the divergent flaps 42 define the channel for circulation of combustion gas 39, and thus allow to channel the flow of gas F4 at the outlet of the turbojet engine 10.

The nozzle 28 further includes an annular row of mobile outer flaps 68 surrounding the set 38 of mobile inner flaps (FIG. 2) and articulated on the stator structure 50 of the turbojet engine in such a way as to move in a manner synchronised with the set 38 of mobile inner flaps.

During operation, the cooling air coming from the cooling plenum 36 escapes freely towards downstream and towards the sides after having contributed to the cooling of the outer envelope 32, and optionally contributes in a marginal manner to the cooling of the set 38 of mobile inner flaps.

The invention, preferred embodiments of which will now be described in reference to FIGS. 4 to 10, proposes an improvement of the nozzle 28 of the variable-geometry convergent-divergent type. More precisely, the invention allows an improvement of the cooling of the set 38 of mobile inner flaps, as will appear more clearly below.

FIG. 4 shows more particularly a follower convergent-divergent flap pair 52B, as well as, disposed radially opposite the latter, a mobile outer flap 68, illustrated very schematically. The explanations given below in reference to FIGS. 4 to 10 are valid for each of the follower convergent-divergent flap pairs 52B of the nozzle 28.

The follower convergent-divergent flap pair 52B, also visible in FIGS. 5A to 7, comprises a convergent flap 40B and a divergent flap 42B.

As explained above, the divergent flap 42B is articulated at its upstream end 44 on the downstream end 46 of the convergent flap 40B, for example via a hinge articulation 45, whereby the follower convergent-divergent flap pair 52B is capable of going from a first extreme angular configuration (FIG. 5A), in which the convergent flap 40B and the divergent flap 42B make between them a maximum salient angle, to a second extreme angular configuration (FIG. 5B), in which the convergent flap 40B and the divergent flap 42B make between them a minimum salient angle smaller than the maximum salient angle.

In a manner analogous to that which is described above, the convergent flap 40B includes a respective wall for channelling combustion gas, hereinafter called inner wall 56, extending according to a respective longitudinal direction of the flap, and having, on a radially inner side, a respective inner surface for channelling combustion gas 58 and, on a radially outer side, a respective outer surface 59.

Unlike the above, the convergent flap 40B includes a respective outer wall 60, extending opposite the outer surface 59 of the inner wall 56 of this flap (FIGS. 4, 5A-5B and 7), for example in parallel to the inner wall 56.

Figure 6:
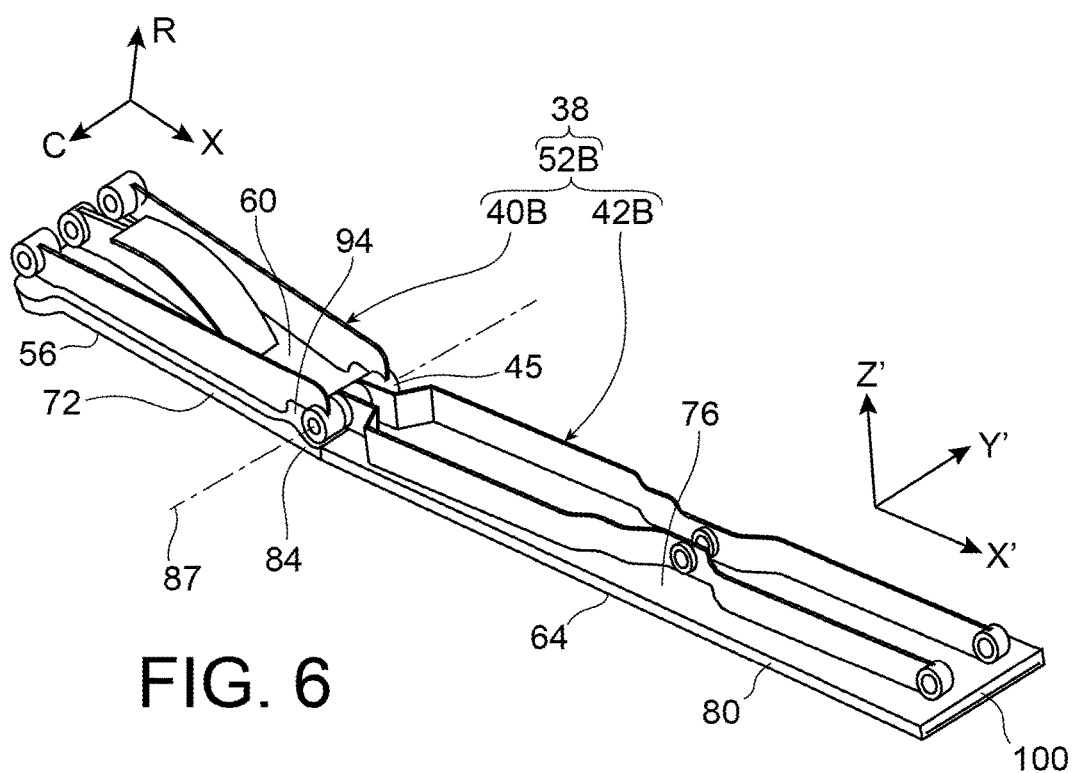
FIG. 6 is a partial schematic perspective view of a convergent-divergent flap pair according to a preferred embodiment of the invention, which is part of the nozzle of the variable-geometry convergent-divergent type of FIG. 4.
Figure 7:
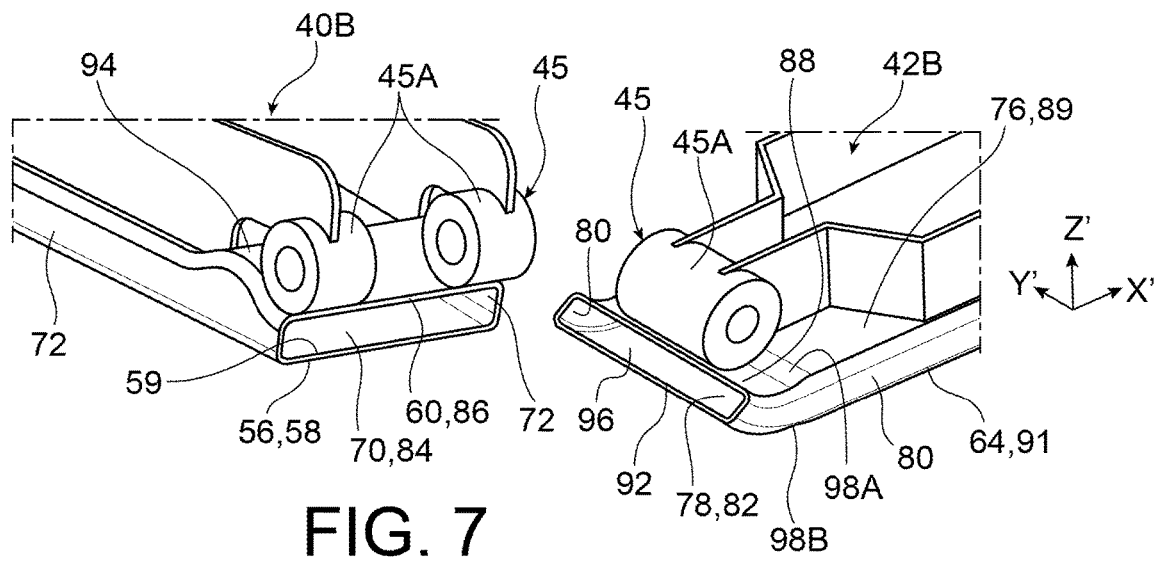
FIG. 7 is a partial schematic perspective view of the convergent-divergent flap pair of FIG. 6, in a disassembled state.

The convergent flap 40B further includes two walls of respective opposite lateral ends 72 each connecting the inner wall 56 of this flap to the outer wall 60 of this flap (FIGS. 6 and 7).

Thus, the convergent flap 40B includes a respective duct for circulation of cooling air 70 (FIGS. 4, 5A-5B, 7) defined between the inner wall 56 and the outer wall 60 of the flap 40B, and between the two walls of lateral ends 72 of this flap.

The duct for circulation of cooling air 70 of the convergent flap 40B includes, at its upstream end, a tip 73 (FIG. 4) configured to be connected to the cooling plenum 36 surrounding the reheat channel 26 (FIG. 2), so that the duct for circulation of cooling air 70 receives a part of the flow of cooling air CF1, during operation.

Moreover, the duct for circulation of cooling air 70 is thus defined in particular by the outer surface 59 of the inner wall 56 of the flap (FIGS. 4, 5A-5B, 7). This latter wall is thus cooled by air circulating in the duct for circulation of cooling air 70, during operation.

In a manner analogous to that which is described above, the divergent flap 42B includes a respective wall for channelling combustion gas, hereinafter called inner wall 64, extending according to a respective longitudinal direction of the flap, and having, on a radially inner side, a respective inner surface for channelling combustion gas 66 and, on a radially outer side, a respective outer surface 67.

To facilitate the present description, an orthonormal reference frame X', Y', Z' is defined so that the direction X' corresponds to the longitudinal direction of the divergent flap 42B, and thus in particular of the inner wall 64 of the latter, and the direction Y' corresponds to a transverse direction of the divergent flap, and the direction Z' corresponds to the direction of the thickness of the divergent flap.

Unlike the above, the divergent flap 42B further includes a respective outer wall 76 extending opposite the outer surface 67 of the inner wall 64 of this flap, for example in parallel to the inner wall 64, so that these two walls 64 and 76 define between them a respective duct for circulation of cooling air 78 of the divergent flap 42B (FIGS. 4, 5A-5B and 7).

The divergent flap 42B further includes two respective lateral end walls 80 each connecting the inner wall 64 to the outer wall 76 of the divergent flap (FIGS. 6, 7), so that the two lateral end walls 80 laterally close (and thus define between them) the duct for circulation of cooling air 78 of the divergent flap 42B.

Figure 5A:
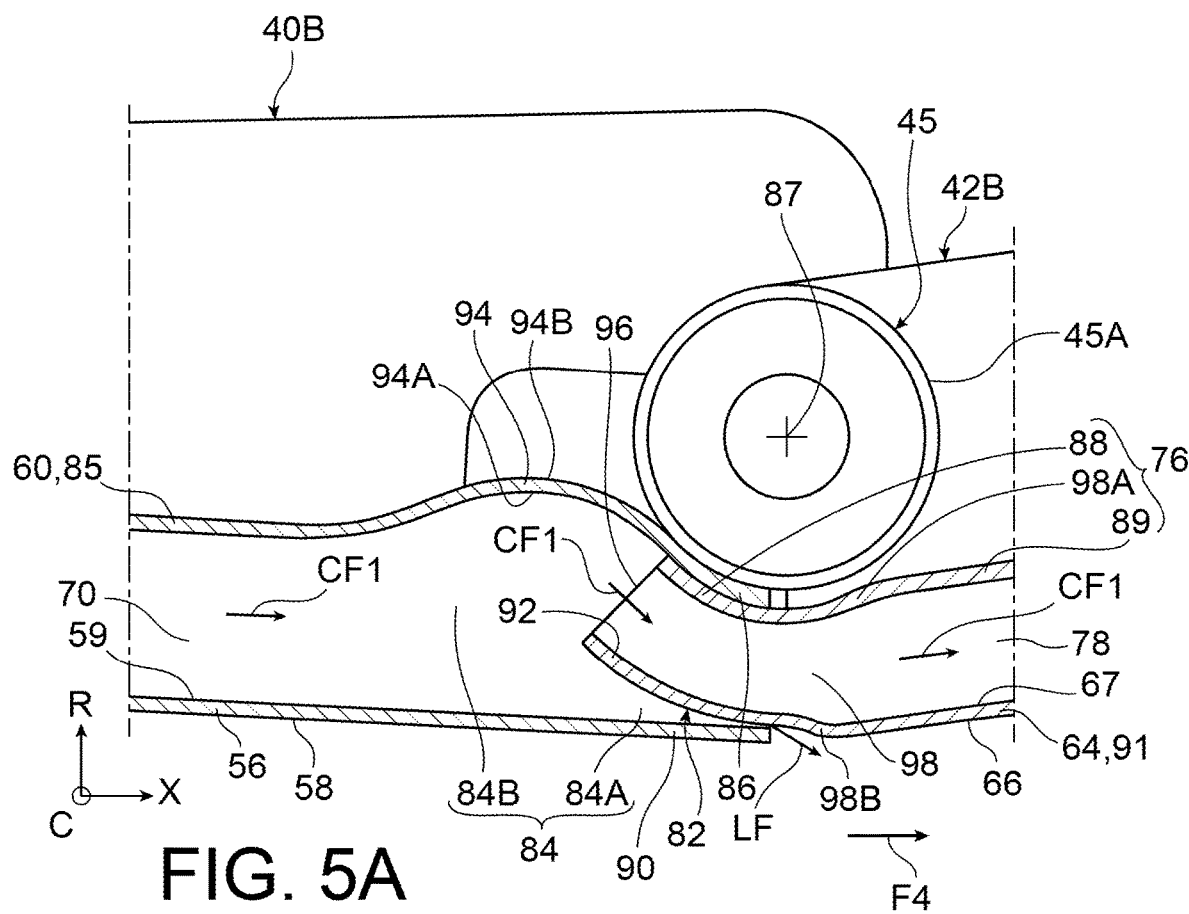
FIG. 5A is a view on a larger scale of a part of FIG. 4.
Figure 5B:
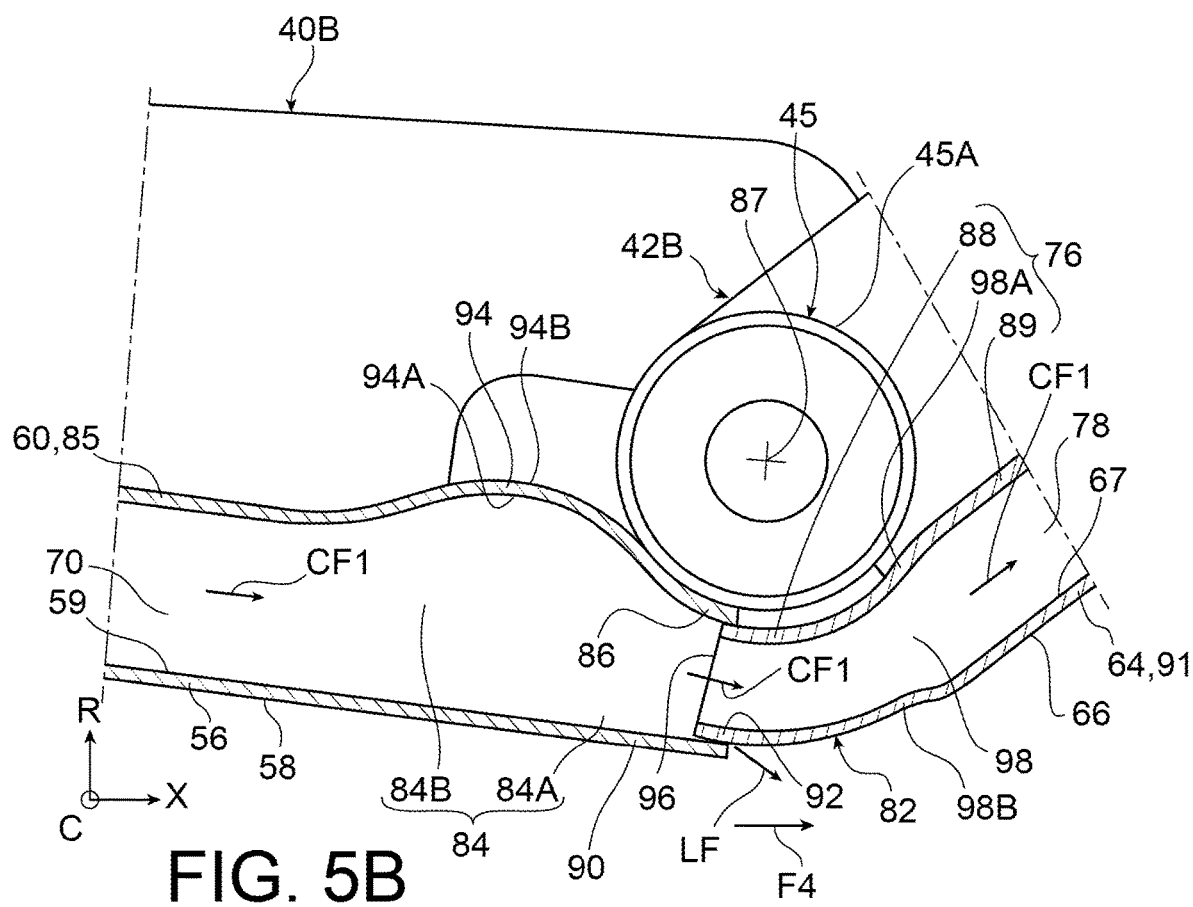
FIG. 5B is a view similar to FIG. 5A, illustrating the convergent-divergent flap pair in a second configuration.

The duct for circulation of cooling air 78 of the divergent flap 42B is connected to the duct for circulation of cooling air 70 of the convergent flap 40B (FIGS. 5A, 5B). The duct for circulation of cooling air 78 of the divergent flap 42B thus receives the flow of cooling air coming from the duct for circulation of cooling air 70 of the convergent flap 40B, or at least the majority thereof, during operation.

For example, the duct for circulation of cooling air 78 of the divergent flap 42B includes for this purpose a respective connection portion 82 cooperating by fitting with a respective end portion 84 of the duct for circulation of cooling air 70 of the convergent flap 40B (FIGS. 4 and 5A-5B).

In particular, the outer wall 60 of the convergent flap 40B includes a respective main portion 85, for example having a flat shape, and a respective end portion 86 that defines a downstream part 84A of the end portion 84 of the duct for circulation of cooling air 70 of the convergent flap 40B (FIGS. 5A and 5B).

The end portion 86 has the shape of a portion of a cylinder of revolution having an axis coinciding with a pivot axis 87 about which the divergent flap 42B pivots with respect to the convergent flap 40B when the follower convergent-divergent flap pair 52B goes from one to the other of the first and second extreme angular configurations. In other words, the pivot axis 87 forms the axis of curvature of the end portion 86.

In the example illustrated, the hinge articulation 45 has an outer surface 45A having a cylindrical shape of revolution centred on the pivot axis 87 and in contact with the end portion 86 of the outer wall 60 of the convergent flap 40B (FIGS. 5A-5B and 7).

The outer wall 76 of the divergent flap 42B includes a respective main portion 89, for example having a flat shape, and a respective end portion 88, which defines the connection portion 82 of the duct for circulation of cooling air 78 of the divergent flap, and which has a shape complementary to the end portion 86 of the outer wall 60 of the convergent flap 40B (FIGS. 5A and 5B). The end portion 88 of the outer wall 76 of the divergent flap 42B thus has the same axis of curvature as the end portion 86 of the outer wall 60 of the convergent flap 40B.

The curved shape of the end portions 86 and 88 allows a relative pivoting movement between the convergent flap 40B and the divergent flap 42B for the passage from one to the other of the first and second configurations of the follower convergent-divergent flap pair 52B.

The end portion 88 of the outer wall 76 of the divergent flap 42B is in surface contact with the end portion 86 of the outer wall 60 of the convergent flap 40B, in such a way that the end portion 88 of the outer wall 76 of the divergent flap slides along the end portion 86 of the outer wall 60 of the convergent flap, when the follower convergent-divergent flap pair 52B goes from one to the other of the first and second extreme angular configurations (FIGS. 5A and 5B respectively).

Alternatively, these two walls can be slightly spaced apart from one another, whereby the end portion 88 of the outer wall 76 of the divergent flap 42B moves opposite the end portion 86 of the outer wall 60 of the convergent flap 40B during the passage from one to the other of the first and second configurations.

In the preferred embodiment illustrated, the connection portion 82 of the duct for circulation of cooling air 78 of the divergent flap 42B is inserted into the end portion 84 of the duct for circulation of cooling air 70 of the convergent flap 40B. In other words, the end portion 84 of the duct for circulation of cooling air 70 of the convergent flap 40B surrounds at least a part of the connection portion 82 of the duct for circulation of cooling air 78 of the divergent flap 42B.

The inner wall 56 of the convergent flap 40B has a flat shape including in a downstream end portion 90 of this wall, which downstream end portion defines the downstream part 84A of the end portion 84 of the duct for circulation of cooling air 70 of the convergent flap 40B.

The inner wall 64 of the divergent flap 42B includes a respective main portion 91, for example having a flat shape, and a respective end portion 92 that defines the connection portion 82 of the duct for circulation of cooling air 78 of the divergent flap 42B.

When viewed in an axial cross-section, the end portion 92 has a shape homothetic to the shape of the end portion 88 of the outer wall 76 of the divergent flap, by a homothetic transformation, the centre of which is located on the pivot axis 87. The end portion 92 thus also has an axis of curvature that is the same as the pivot axis 87. "Axial cross-section" should be understood as a cross-section according to a plane comprising the longitudinal axis 11 of the turbojet engine, that is to say according to a plane orthogonal to the inner wall 64 of the divergent flap 42B and to the pivot axis 87.

The end portion 92 of the inner wall 64 of the divergent flap 42B can thus move opposite the downstream end portion 90 of the inner wall 56 of the convergent flap 40B when the follower convergent-divergent flap pair 52B goes from one to the other of the first and second extreme angular configurations.

The connection portion 82 of the duct for circulation of cooling air 78 of the divergent flap 42B and the end portion 84 of the duct for circulation of cooling air 70 of the convergent flap 40B are configured in order for possible leaks of air LF between the duct for circulation of cooling air 70 of the convergent flap 40B and the duct for circulation of cooling air 78 of the divergent flap 42B to be located between the end portion 92 of the inner wall 64 of the divergent flap 42B and the downstream end portion 90 of the inner wall 56 of the convergent flap 40B.

In the example illustrated, this particularity is obtained, on the one hand, via the contact between the end portion 88 of the outer wall 76 of the divergent flap 42B and the end portion 86 of the outer wall 60 of the convergent flap 40B, which prevents the leaks of air between these two walls, and on the other hand, via a slight play between the end portion 92 of the inner wall 64 of the divergent flap 42B and the downstream end portion 90 of the inner wall 56 of the convergent flap 40B.

Thus, the possible leaks of air LF between the duct for circulation of cooling air 70 of the convergent flap 40B and the duct for circulation of cooling air 78 of the divergent flap 42B occur in the same direction as the flow of gas F4 coming from the reheat channel 26. The head losses induced by the possible leaks of air LF are thus minimised. Moreover, these possible leaks of air LF can thus form a cooling film along the inner surface wall for channelling combustion gas 66 of the divergent flap 42B, and thus contribute to the cooling of the divergent flap 42B.

Moreover, the outer wall 60 of the convergent flap 40B includes a bulge 94 adjacent to the end portion 86 of this outer wall 60, the bulge being shaped in such a way as to have an inner surface 94A having a concave shape and an outer surface 94B having a convex shape. "Inner surface" should be understood as a surface defining the duct for circulation of cooling air 70 of the convergent flap 40B. "Outer surface" should be understood as a surface outside of said duct. The bulge 94 defines an upstream part 84B of the end portion 84 of the duct for circulation of cooling air 70 of the convergent flap 40B. The bulge 94 and the end portion 86 of the outer wall 60 of the convergent flap conjointly have the shape of a wave.

The bulge 94 allows to orient the flow of cooling air CF1 substantially orthogonally to an inlet section 96 of the connection portion 82 of the duct for circulation of cooling air 78 of the divergent flap 42B (FIGS. 5A and 5B).

In the preferred embodiment described, the connection portion 82 of the duct for circulation of cooling air 78 of the divergent flap 42B includes a sonic throat 98. The connection portion 82 thus allows to accelerate beyond Mach 1 the cooling air coming from the duct for circulation of cooling air 70 of the divergent flap 40B, at least for a critical point of the range of operating speeds with reheat of the turbojet engine.

More precisely, the outer wall 76 of the divergent flap 42B includes a sonic throat portion 98A connecting the main portion 89 of this wall to the end portion 88 of this wall. The inner wall 64 of the divergent flap 42B includes a sonic throat portion 98B connecting the main portion 91 to the end portion 92 of this wall. The sonic throat portions 98A and 98B diverge from one another in the downstream direction and are curved in an aerodynamic manner. In particular, when viewed from the inside of the connection portion 82 of the duct 78, each sonic throat portion 98A, 98B includes a convex respective upstream part, and a concave respective downstream part, separated from one another by an inflection line.

Figure 9:
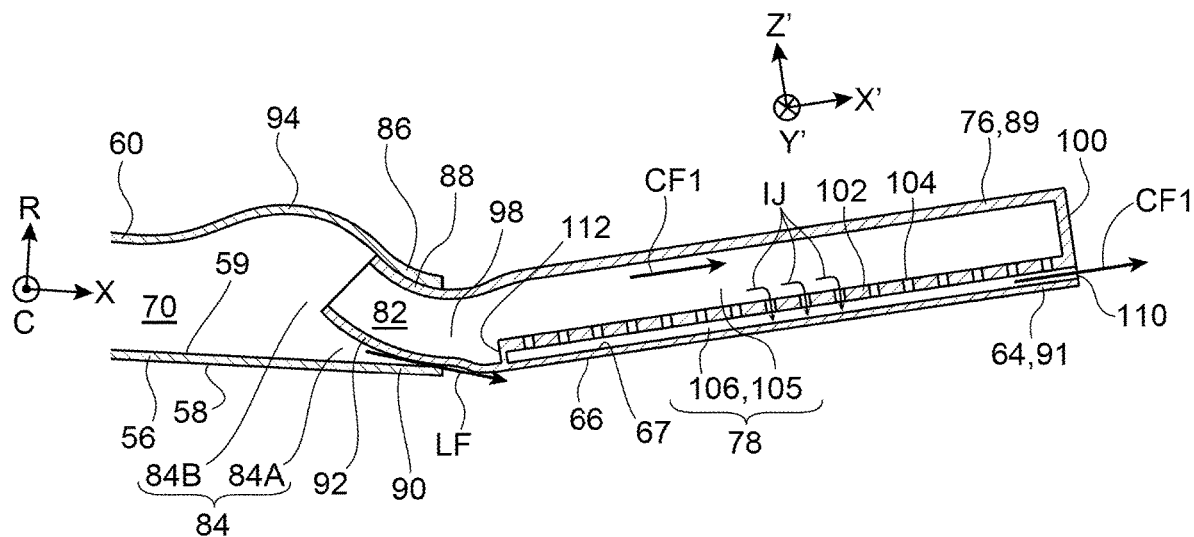
FIG. 9 is a partial schematic view of an axial cross-section of the convergent-divergent flap pair of FIG. 8.

Moreover, the divergent flap 42B includes a respective downstream end wall 100 (FIGS. 4, 6) arranged at a downstream end of the duct for circulation of cooling air 78 of the divergent flap 42B, and creating at least one opening 110 by which this duct opens downstream (visible only in FIG. 9, for reasons of clarity). This should be understood as meaning that at least one such opening is formed in the downstream end wall 100 and/or that at least one such opening is adjacent to the downstream end wall 100, that is to say arranged between an edge of the downstream end wall 100 and one out of the inner wall 64, the outer wall 76, and the lateral end walls 80. The downstream end wall 100 thus connects to each other at least some out of the inner wall 64, the outer wall 76, and the lateral end walls 80.

Such an opening allows the exhaust of the flow of cooling air CF1 out of the duct for circulation of cooling air 78 of the divergent flap 42B downstream, during operation.

The duct for circulation of cooling air 78 of the divergent flap 42B advantageously extends until the downstream end of the inner wall 64 of this flap, so that the entirety of this wall is cooled by the flow of cooling air CF1 during operation.

Figure 8:
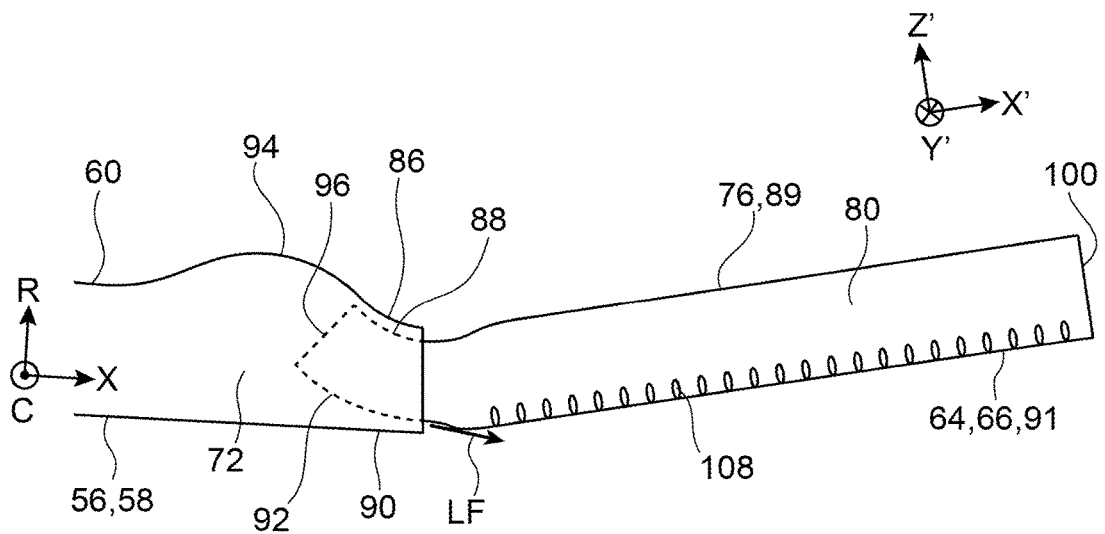
FIG. 8 is a partial schematic side view of a convergent-divergent flap pair according to another preferred embodiment of the invention.
Figure 10:
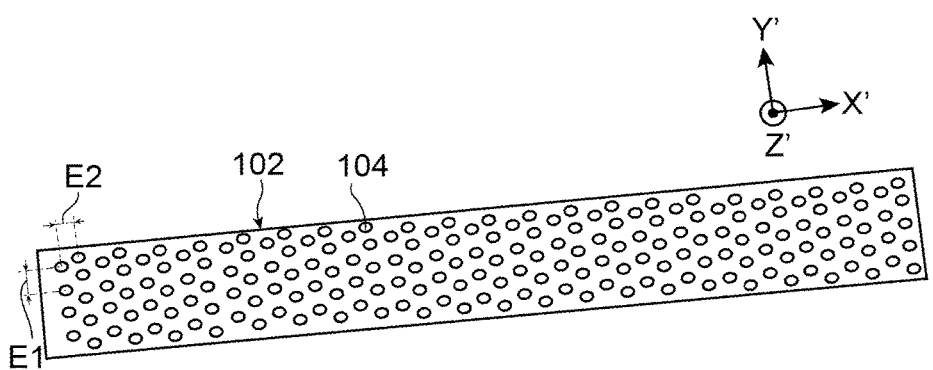
FIG. 10 is a partial schematic top view of a multiperforated plate of a divergent flap of the convergent-divergent flap pair of FIG. 8.

In another preferred embodiment of the invention illustrated by FIGS. 8 to 10, the divergent flap 42B further includes a multiperforated plate 102, provided with impingement cooling orifices 104, and extending in the duct for circulation of cooling air 78 of this flap, that is to say between the inner wall 64 and the outer wall 76 of this flap.

The multiperforated plate 102 divides the duct for circulation of cooling air 78 into a cavity for circulation of cooling air 105 defined between the outer wall 76 and the multiperforated plate 102 and communicating directly with the duct for circulation of cooling air 70 of the corresponding convergent flap 40B, and an impingement cooling cavity 106 defined between the multiperforated plate 102 and the outer surface 67 of the inner wall 64 of this flap, to allow a cooling of this wall 64 by impingement of jets of air formed through the impingement cooling orifices 104 from air coming from the cavity for circulation of cooling air 105 (FIG. 9).

For this purpose, the multiperforated plate 102 preferably extends at a small distance from the outer surface 67 of the inner wall 64, for example at a distance of approximately 1 mm from the latter.

The flow of cooling air CF1 circulating in the cavity for circulation of cooling air 105 thus penetrates into the impingement cooling cavity 106 while forming impingement jets IJ through the impingement cooling orifices 104 of the multiperforated plate 102, during operation. The impingement jets IJ allow optimal cooling of the inner wall 64.

Moreover, each of the lateral end walls 80 is advantageously provided with air passage orifices 108 (FIG. 8) through which the impingement cooling cavity 106 opens into the channel for circulation of combustion gas 39. The orifices 108 can have any suitable shape, for example circular, oblong, elliptical, or be in the form of slots.

Thus, the air coming from the impingement jets IJ can circulate in a lateral direction in the impingement cooling cavity 106, until it exits through the air passage orifices 108, during operation.

This operating mode allows to avoid as much as possible the air coming from an impingement jet IJ formed through a determined orifice 104, and having been heated by the inner wall 64 by cooling the latter, from circulating downstream and thus heating other impingement jets formed through other orifices 104 arranged downstream of the aforementioned determined orifice 104, thus reducing the cooling capacity of these other impingement jets.

Moreover, the lateral circulation of the air in the impingement cooling cavity 106 allows to reduce the interaction by mutual shearing between adjacent impingement jets.

Moreover, the air passage orifices 108 open opposite the walls for channelling combustion gas 64 of the respective divergent flaps 42A of the two controlled convergent-divergent flap pairs 52A adjacent to the follower convergent-divergent flap pair 52B considered.

These adjacent divergent flaps 42A are less exposed to the heat of the combustion gases than the follower divergent flaps 42B. For example, in FIG. 3, it is clear that each follower divergent flap 42B has lateral-end parts 42B-L respectively extending in front of parts of respective lateral ends 42A-L of the two adjacent controlled divergent flaps 42A, and thus masking these parts of respective lateral ends of the controlled divergent flaps 42A with respect to the combustion gases. Thus, only a respective median part 42A-M of each controlled divergent flap 42A is directly exposed to the combustion gases.

The air coming from the air passage orifices 108 can thus be sufficient to cool the respective median parts 42A-M of the controlled divergent flaps 42A, in which case the controlled divergent flaps 42A are advantageously flaps with a simple skin, that is to say not having a duct for circulation of cooling air.

Moreover, the impingement cooling orifices 104 are advantageously arranged in staggered rows (FIG. 10). The longitudinal step E1 between two rows of orifices and the lateral step E2 between orifices in each row are for example each equal to 1 cm, whereas the diameter of each orifice 104 is for example equal to 1 mm.

Moreover, the opening 110 made by the downstream end wall 100 of the divergent flap 42B is advantageously an opening through which the impingement cooling cavity 106 opens towards the outside of the duct for circulation of cooling air 78 (FIG. 9).

For this purpose, the opening 110 is formed between the multiperforated plate 102 and the inner wall 64 of the divergent flap 42B. For example, the downstream end wall 100 extends until the multiperforated plate 102, and not beyond the latter in the direction of the inner wall 64.

Alternatively, the downstream end wall 100 can extend until the inner wall 64 and include one or more openings 110 through which the impingement cooling cavity 106 opens towards the outside of the duct for circulation of cooling air 78.

Thus, a part of the air coming from the impingement jets IJ can escape from the impingement cooling cavity 106 downstream through the opening 110 or each opening 110, during operation.

The divergent flap 42B further includes a closing wall 112 connecting the multiperforated plate 102 to the inner wall 64 in such a way as to close an upstream end of the impingement cooling cavity 106 and thus separate the latter from an upstream end part of the cavity for circulation of cooling air 105 (FIG. 9).

Such a closing wall 112 allows in particular to avoid air penetrating into the impingement cooling cavity 106 without passing through orifices 104 of the multiperforated plate, and to avoid a recirculation of the air after its passage through the orifices 104 of the multiperforated plate 102.

Moreover, the nozzle 28 advantageously includes a space for air outlet 120 arranged between a downstream end of the divergent flap 42B and a downstream end of the mobile outer flap 68 arranged facing the divergent flap 42B (FIG. 4). Such a space for air outlet 120 allows the exhaust of air coming from possible leaks LF2 between circumferentially adjacent mobile inner flaps, and/or of air TA coming from an exterior plenum, routinely called "tunnel", surrounding the turbojet engine in the fuselage of an aircraft.

During operation, the flow of gas F4, consisting of the mixture of the combustion gases coming from the primary jet, and of the bypass flow F3, circulates in the reheat channel 26, then exits the turbojet engine 10 through the nozzle 28, as explained above in reference to FIG. 2.

The flow of cooling air CF1 circulates along the outer envelope 32 in the cooling plenum 36 (FIG. 2) then penetrates into the duct for circulation of cooling air 70 of the convergent flap 40B via the tip 73 of the latter (FIG. 4).

The flow of cooling air CF1 circulates in the duct for circulation of cooling air 70 until the end portion 84 of the latter, thus cooling the convergent flap 40B, in particular the inner wall 56 of this flap.

Then the flow of cooling air CF1 penetrates into the duct for circulation of cooling air 78 of the corresponding divergent flap 42B via the connection portion connection portion 82 of the latter then circulates in this duct, before exiting therefrom through the opening 110 made by the downstream end wall 100 of the divergent flap 42B.

In the embodiments described, the flow of cooling air CF1 is accelerated until a supersonic speed by passing through the sonic throat 98.

In the particular case of the second preferred embodiment of the invention, the flow of cooling air CF1 circulates in the cavity for circulation of cooling air 105 of the duct for circulation of cooling air 78, and passes through the impingement cooling orifices 104 of the multiperforated plate 102 while forming impingement jets IJ. The latter allow optimal cooling of the inner wall 64 of the divergent flap 42B.

Most of the air coming from the impingement jets IJ circulates in the direction of the two lateral end walls 80 of the flap, then exits the duct 78 by passing through the air passage orifices 108 formed in these walls 80. Another part of the air coming from the impingement jets IJ circulates in the downstream direction then exits the duct 78 by passing through the opening 110 made by the downstream end wall 100 of the divergent flap 42B.

In general, the invention can be applied to any type of turbojet engine comprising a nozzle of the variable-geometry convergent-divergent type, and in particular further comprising a reheat channel upstream of said nozzle.

What is claimed is:

1. A convergent-divergent flap pair for a turbojet engine nozzle of a variable-geometry convergent-divergent type, comprising a convergent flap, and a divergent flap mounted pivotably on the convergent flap about a pivot axis, whereby the convergent-divergent flap pair is capable of going from a first extreme angular configuration, in which the convergent flap and the divergent flap make between them a maximum salient angle, to a second extreme angular configuration, in which the convergent flap and the divergent flap make between them a minimum salient angle smaller than the maximum salient angle, wherein the convergent flap includes a respective inner wall, having a respective inner surface for channelling combustion gas and a respective outer surface, and a respective outer wall, wherein the convergent flap includes a respective duct for circulation of cooling air defined between the respective outer surface of the respective inner wall of the convergent flap, and the respective outer wall of the convergent flap, wherein the divergent flap includes a respective inner wall, having a respective inner surface for channelling the combustion gas and a respective outer surface, and a respective outer wall, wherein the divergent flap includes a respective duct for circulation of cooling air defined between the respective outer surface of the respective inner wall of the divergent flap, and the respective outer wall of the divergent flap, and connected to the respective duct for circulation of the cooling air of the convergent flap, wherein the divergent flap further includes a multiperforated plate provided with impingement cooling orifices, and extending between the respective inner wall and the respective outer wall of the divergent flap, whereby the multiperforated plate divides the respective duct for circulation of the cooling air of the divergent flap into:
a cavity for circulation of cooling air, defined between the respective outer wall of the divergent flap and the multiperforated plate, and connected to the respective duct for circulation of cooling air of the convergent flap, and
an impingement cooling cavity defined between the multiperforated plate and the respective outer surface of the respective inner wall of the divergent flap, to allow a cooling of the respective inner wall of the divergent flap by impingement of jets of air formed through the impingement cooling orifices from air circulating in the cavity for circulation of the cooling air, wherein the divergent flap includes two opposite respective lateral end walls each connecting the respective inner wall of the divergent flap to the respective outer wall of the divergent flap, so that each of the cavity for circulation of cooling air and the impingement cooling cavity is further defined by the two respective lateral end walls of the divergent flap, wherein each of the two respective lateral end walls of the divergent flap is provided with air passage orifices through which the impingement cooling cavity opens towards an outside.

2. The convergent-divergent flap pair according to claim 1, wherein the divergent flap includes a respective downstream end wall providing at least one opening by which the impingement cooling cavity opens downstream.

3. The convergent-divergent flap pair according to claim 2, wherein the respective downstream end wall of the divergent flap connects the respective outer wall of the divergent flap to the multiperforated plate of the divergent flap.

4. The convergent-divergent flap pair according to claim 1, wherein the divergent flap includes a closing wall connecting the multiperforated plate of the divergent flap to the respective inner wall of the divergent flap in such a way as to close an upstream end of the impingement cooling cavity of the divergent flap.

5. A nozzle of a variable-geometry convergent-divergent type for a turbojet engine, comprising convergent-divergent flap pairs distributed around an axis of the nozzle and at least some of which are convergent-divergent flap pairs according to claim 1, and a channel for circulation of the combustion gas defined at least by the respective inner surfaces for channelling the combustion gas of the respective inner walls of the respective convergent flaps and of the respective divergent flaps of the convergent-divergent flap pairs.

6. A turbojet engine for an aircraft, comprising a reheat channel surrounded by a cooling plenum separated from the reheat channel by a thermal protection liner, and the nozzle according to claim 5, wherein the respective ducts for circulation of the cooling air of the convergent flaps of the convergent-divergent flap pairs of the nozzle are connected to the cooling plenum surrounding the reheat channel.

7. The nozzle according to claim 5, wherein the convergent-divergent flap pairs form follower convergent-divergent flap pairs, the nozzle further comprising controlled convergent-divergent flap pairs arranged in alternation circumferentially with the follower convergent-divergent flap pairs and comprising respective divergent flaps comprising the respective inner walls for channelling combustion gas having respective inner surfaces for channelling the combustion gas defining the channel for circulation of the combustion gas.

8. The nozzle according to claim 7, wherein the air passage orifices of the lateral end walls of the respective divergent flaps of the follower convergent-divergent flap pairs open into the channel for circulation of the combustion gas, facing the respective inner walls for channelling the combustion gas of the respective divergent flaps of the controlled convergent-divergent flap pairs.

9. The nozzle according to claim 8, wherein the respective divergent flaps of the controlled convergent-divergent flap pairs are flaps with a simple skin.

* * * * *